United States Patent
Mueller

[15] 3,651,713
[45] Mar. 28, 1972

[54] LOCKS FOR SECURING AXLES TO A DIFFERENTIAL

[72] Inventor: Otto Mueller, 13 Byfield Lane, Dearborn, Mich. 48120

[22] Filed: May 1, 1970

[21] Appl. No.: 33,843

[52] U.S. Cl. ................................................................74/713
[51] Int. Cl. ..............................................................F16h 1/40
[58] Field of Search ........................................74/710, 713

[56] References Cited

UNITED STATES PATENTS

| | | |
|---|---|---|
| 1,508,832 | 9/1924 | Zimmerschied et al. ..............74/713 |
| 2,187,843 | 1/1940 | Rzeppa ..................................74/713 |
| 3,310,999 | 3/1967 | Griffith ..................................74/710 |

Primary Examiner—C. J. Husar
Attorney—Harness, Dickey & Pierce

[57] ABSTRACT

The axle lock is formed by a cam plug and a set of balls mounted within an axially disposed recess at the inner end of the axles which are supported in driving relation within the side gears of the differential. The rotation of the pinion gear shaft moves the cam plugs further into the recesses and the balls outwardly into locking engagement within an annular recess within the side gears. The pinion gear shaft is then secured against rotation by a pin or screw which extends therethrough.

10 Claims, 8 Drawing Figures

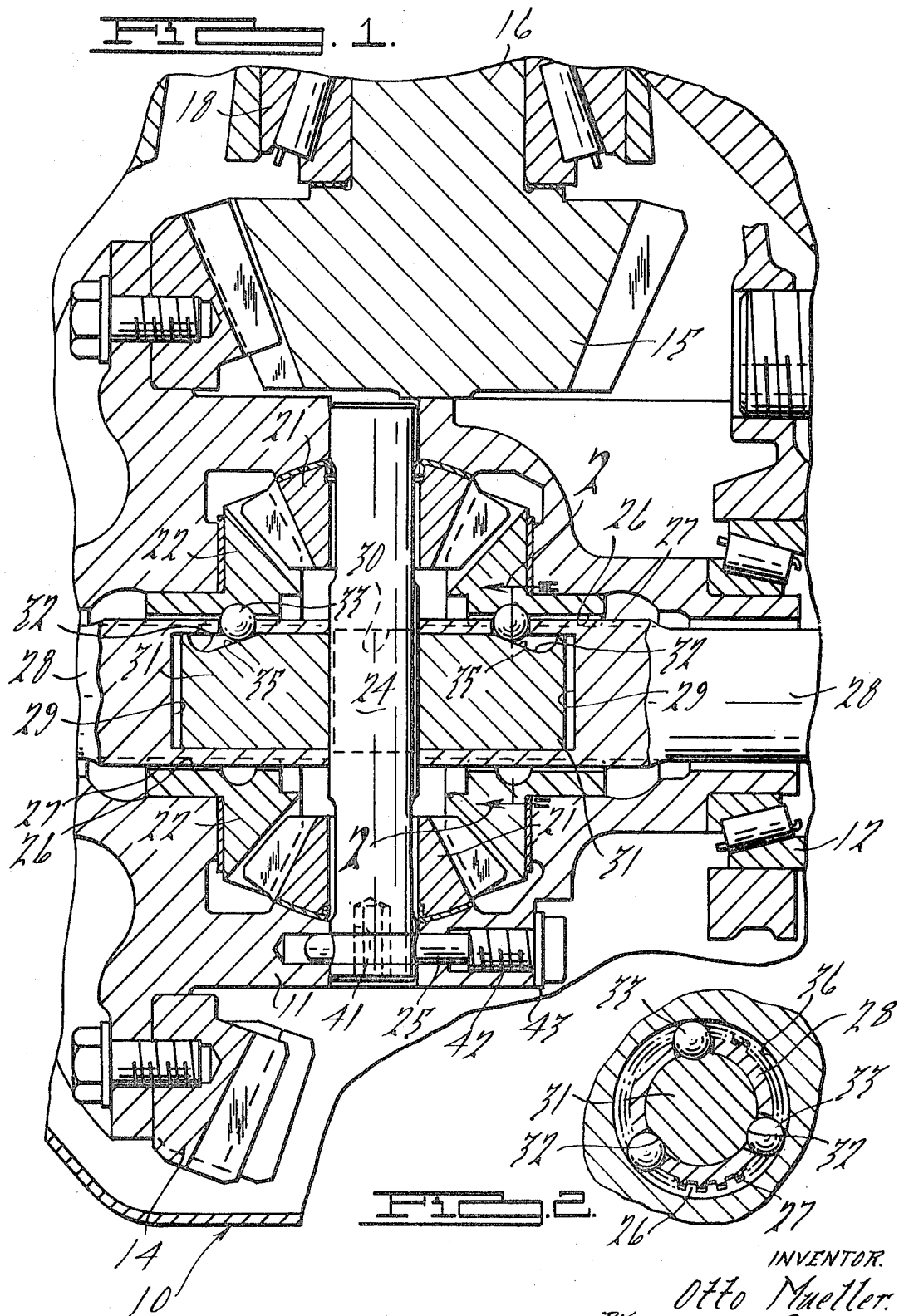

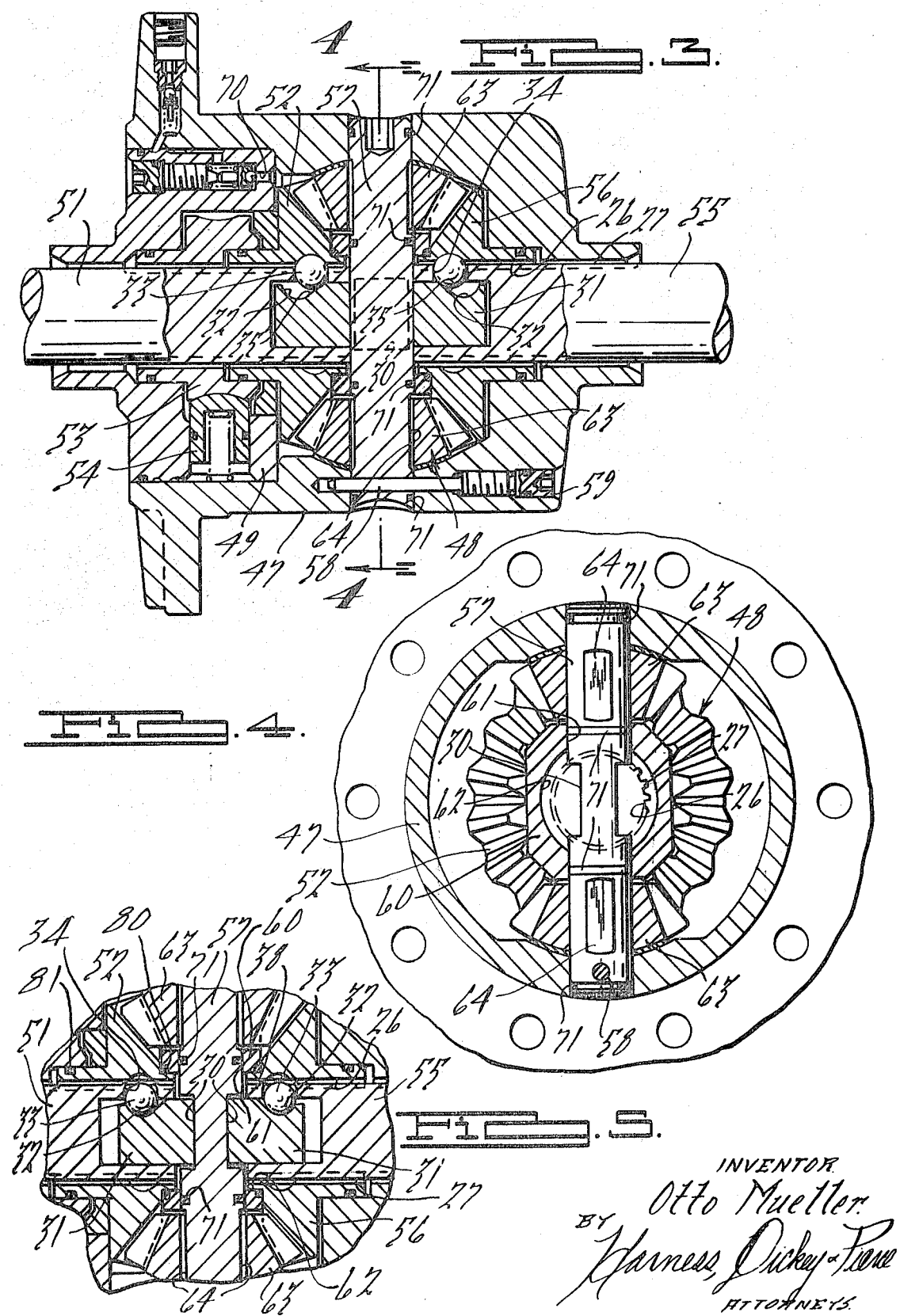

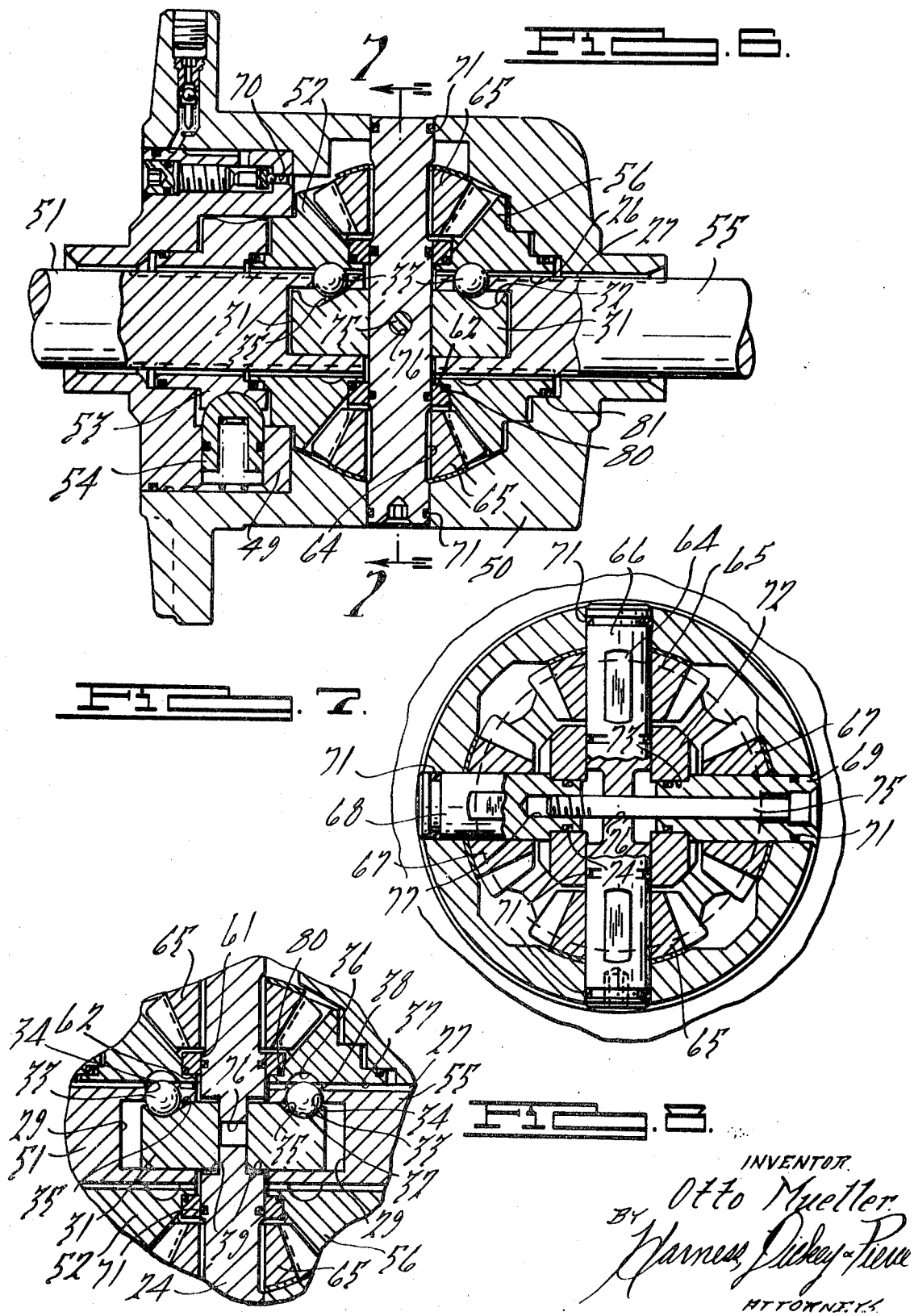

LOCKS FOR SECURING AXLES TO A DIFFERENTIAL

BACKGROUND OF THE INVENTION

Reference may be had to the O. Mueller Patent No. 3,393,583, issued July 23, 1968 for "Self-Locking Differential Transmission."

SUMMARY OF THE INVENTION

The present invention pertains to a simplified lock for securing the inner ends of the axles of a vehicle to the driven elements of a differential and retain said axles in driving position. It has been the practice to lock the axles in driving position within the differential near the outer ends of the axles or secure the inner ends against outward movement during the assembly of the case within the differential housing. With the present lock, the axles can be secured to the side gears after the assembly of the case within the housing by the rotation of the pinion shaft after the axles have been inserted in the side gears. This is especially desirable when the case is constructed as a unit element which produces a locking differential while being driven. The inner ends of the axles are recessed for receiving a cam plug which is movable axially therein. The wall formed by the recess has one or more apertures through which locking detents are projectable.

In the embodiment herein illustrated, camming recesses are provided in the plug and apertures extend through the wall of the recess which are eventually spaced substantially 120° apart in alignment with the camming recesses. A ball is retained in each aperture by a slight peaning of the outer wall surface about the aperture edge. When the balls are in retracted position, the cam plugs extend beyond the outer end of the axle recesses in position to extend within notches on opposite sides of the pinion shaft when the balls are aligned with an annular recess in the wall of the aperture through the side gears. Upon turning the pinion shaft 90°, the cam plugs are moved further into the recesses and the balls are cammed outwardly into the annular recess in the side gears and thereby lock the axles against axial movement. The pinion shaft is thereafter locked against rotation by a pin, screw or other element.

BRIEF DESCRIPTION OF THE DRAWINGS

FIG. 1 is a broken sectional view of a differential showing the axles locked to the side gears by the locking device of the present invention;

FIG. 2 is a broken sectional view of structure illustrated in FIG. 1, taken on the line 2—2 thereof;

FIG. 3 is a reduced view of structure, similar to that illustrated in FIG. 1, showing another form of the invention with the axles locked in position;

FIG. 4 is a sectional view of the structure illustrated in FIG. 3, taken on the line 4—4 thereof;

FIG. 5 is a view of the structure illustrated in FIG. 3, taken at the central portion thereof showing the inserted axles with the locking elements in retracted position;

FIG. 6 is a view of structure similar to that illustrated in FIG. 3, showing another form of the invention with the axles locked to the side gears;

FIG. 7 is a sectional view of the structure illustrated in FIG. 6, taken on the line 7—7 thereof, and FIG. 8 is a view of the structure illustrated in FIG. 6 before the axles are locked to the side gears.

DESCRIPTION OF THE PREFERRED EMBODIMENTS

Referring to FIGS. 1 and 2, a differential is illustrated having a housing 10 which supports a case 11 on a pair of like bearings 12. The case supports a ring gear 14 which is driven by a pinion 15 through a stub shaft 16 secured to the housing 10 by one or more bearings 18 and driven through a transmission and engine (not shown) in the conventional manner. The case 11 supports a set of pinion gears 21 having teeth which mate with teeth of side gears 22 which are of conventional construction. The pinion gears 21 are supported on a shaft 24 which extend through apertures in the case 11 and which is locked in position against turning by a pin 25 having threads on one end thereof. The side gear 22 have internal splines 26 engaged by splines 27 on the inner ends of the driven axles 28.

Each axle 28 has a recess 29 on the inner end in which a cam plug 31 is mounted for axial movement. The cam plug 31 has three equally spaced truncated spherical recesses 32 therein which when the cam plug extends outwardly beyond the end of the shaft support detents in the nature of hardened balls 33 within apertures 34 through the wall outwardly portion of the axle defining the recess. The recesses 32 in the cam plugs 31 have a sloping portion 35 which cams the balls 33 outwardly when the cam plugs 31 are moved into the recesses 29 for moving the balls outwardly of the apertures 34 further into an annular recess 36 of arcuate cross section. The recess 36 cuts through the splines in the aperture 37 of the side gears and when the balls extend therein to the axles are retained against longitudinal movement. The balls are retained within the apertures 34 by having the outer ends thereof peaned inwardly at one or more points 38 for preventing the balls from falling from the apertures but which permits them to extend outwardly thereof.

When the axles are inserted into the case and side gears, the balls are moved inwardly and cam the cam plugs 31 outwardly into extended position so as to enter the notches 30 in opposite faces of the pinion gear shaft 24. The shaft 24 is turned 90° by a tool inserted in a receiving recess 41 provided in the end of the shaft. This rotation moves the cam plugs 31 away from each other toward the bottom of the recesses 29 camming the balls 33 outwardly into the annular recesses 36 in the side gears. The shaft 24 is retained in the 90° rotated position by the pin 25 which is locked in position by the threaded end 42 and lock washer 43.

If either or both of the shafts are to be removed, it is only necessary to remove the screw 42 with its pin 25 and rotate the shaft 24 to align the cam plugs with the notches 39 in the shaft 24 to permit the balls 33 to cam the plugs 31 forwardly as the axles 28 are withdrawn to permit the balls to leave the annular recess 36 in the side gears 22 and move within the aperture 34 in the wall portion of the axles to permit the axle or axles to be withdrawn.

The locking of the axles in this manner to the side gears is of importance when the locking differential illustrated and described in the above set forth patent and illustrated herein in FIGS. 3, 4 and 5 is employed in the housing assembly. With the case 47 of unit construction and with the differential gearing 48 assembled therein along with the fluid actuated torque bias control unit 49, the particular lock for the axles has specific application. In this arrangement, a closed hydraulic loop circuit controls the torque bias between the pair of axles. An axle 51 not only is driven by a side gear 52 but the axle also drives a cam element 53 by which the pistons 54 of the torque bias control unit 49 are driven. The operation of the control unit 49 is clearly illustrated and described in the above mentioned patent and will not be further described herein. A second axle 55 is connected to a side gear 56 in the manner pointed out hereinabove. The locking of the axles 51 and 55 to the side gears 52 and 56 of the differential unit occurs upon the rotation of the pinion shaft 57. The shaft is prevented from turning thereafter by a pin 58 retained in position by a threaded section 59 thereon having an O-ring for sealing the pin aperture. The shaft has a pinion 63 at each end and flats 64 thereon for permitting a flow of oil between the surface of the aperture of the pinions and that of the shaft 57. A pinion shaft support 60 has an aperture 61 through which the shaft 57 extends and an aperture 62 into which the inner ends of the side gears 52 and 56 extend. The shaft 57 is sealed to the case 47 and to the support 60 by O-rings 71. The side gears 52 and 56 are sealed to the case 47 and to the torque bias control unit 49 by O-rings 81 and to the support 60 by O-rings 80.

The structure of FIGS. 6, 7 and 8 is similar to that of FIGS. 3, 4 and 5 with the exception that instead of using a pinion 65 on each end of the pinion shaft 66, two additional pinions 67 are employed which are mounted on stub shafts 68 and 69 disposed in aligned relation and 90° from the shaft 66. The stub shafts 68 are sealed to the case by O-rings 71 and to a pinion shaft support 72 through which the shaft 66 extends. The support 72 has aligned apertures 73 into which a shouldered end of the stub shafts 68 and 69 extend and in which they are sealed by O-rings 74. The pinion shaft 66 is likewise sealed to the case 50 and to the pinion shaft support 72 by similar O-rings 71. The side gear 52 is sealed to the pinion shaft support 72 by an O-ring 80 and to the torque bias control unit 49 by an O-ring 81. The side gear 56 is sealed to the pinion shaft support 72 by an O-ring 80 and to the case by an O-ring 81. All of the pinion gears and side gears are sealed within the case and from the splined area of the side gears and the axle ends which extend within the case. The interior of the case forms a reservoir for oil which is in communication with the torque control unit 49 through the passageway 70.

After the pinion shaft 66 has been rotated through 90° to move the cam plugs 31 into locking position, as illustrated in FIGS. 6 and 7, a screw 75 is passed through an aperture in the stub shaft 69, through an aperture 76 at the center of the shaft 66 and into a threaded aperture 77 at the inner end of the stub shaft 68. This not only locks the stub shafts into fixed aligned relation to each other and the sleeve 72 but also prevents the shaft 66 from turning. With this arrangement, four pinions are employed for driving the two side gears, as illustrated in FIGS. 6, 7 and 8, instead of a single pair of pinions, as illustrated in FIGS. 3, 4 and 5.

The axles are illustrated as having locking elements at the inner end which may be applied to a standard differential or to locking or other types of differentials which are completely assembled before the axles are applied thereto. This permits the inner ends of the axles to be locked to the driving members of the differential after the complete assembly thereof. The axles and the locking elements are herein illustrated as being the same in all instances, the cam plug means or similar locking elements being moved into the recesses at the end of the axles by the rotation of the pinion shaft through 90° to engage the recesses in the side gears and lock the axles against longitudinal movement. The pinion shaft is thereafter prevented from rotating by the use of a threaded pin extending therethrough and through the case or by the use of a screw for joining the two stub shafts to the pinion shaft when four pinions are employed in the differential unit.

I claim:
1. In a differential housing, a case within said housing having driving means, pinion gears carried by said case for driving a pair of said side gears which drives a pair of aligned axles, the inner end of each axle having a recess extending thereinto, a shaft for supporting said pinion gears having cam means between the ends thereof, axles extending within the side gears, movable means within the recess at the inner ends of each axle engageable by said cam means, and means for rotating said shaft and cam means which moves said movable means into locking engagement with said side gears.

2. In a differential as recited in claim 1, wherein said movable means is a cam plug within a recess in the adjacent axle ends, and means extensible through the wall of the recess into recess means within the side gears when the cam plugs are moved into the recesses in the axles by said cam means.

3. In a differential as recited in claim 2, wherein the cam means on the shaft are notches on opposite sides thereof.

4. In a differential as recited in claim 3, wherein said extensible means are balls which move within apertures in the axle wall.

5. In a differential as recited in claim 4, wherein said recess means in the side gears is a groove into which said balls extend when locking the axles to the side gears against longitudinal movement.

6. In a differential as recited in claim 5, wherein engaging splines are provided on the exterior surface of the shaft ends and within the side gears for providing driving relation therebetween.

7. In a differential as recited in claim 1, wherein a second pair of pinions are employed, stub shafts for said last pinions, a support about the pinion shaft having aligned apertures into which the inner ends of the stub shafts extend, and a screw extending through one of the stub shafts and said pinion shaft into a threaded aperture in said other stub shaft.

8. In a differential as recited in claim 1, wherein securing means is provided for preventing the rotation of the pinion shaft after it is actuated.

9. In a differential as recited in claim 8, wherein said securing means is a screw having a pin extending from one end thereof.

10. In a differential as recited in claim 7, wherein the pinion gears shaft, stub shafts and side gears are sealed to the pinion shaft support and to the case to retain a lubricant therewithin.

* * * * *